May 26, 1959
R. B. MATTHEWS
2,888,024
FLOW CONTROL DEVICE
Filed Feb. 6, 1956
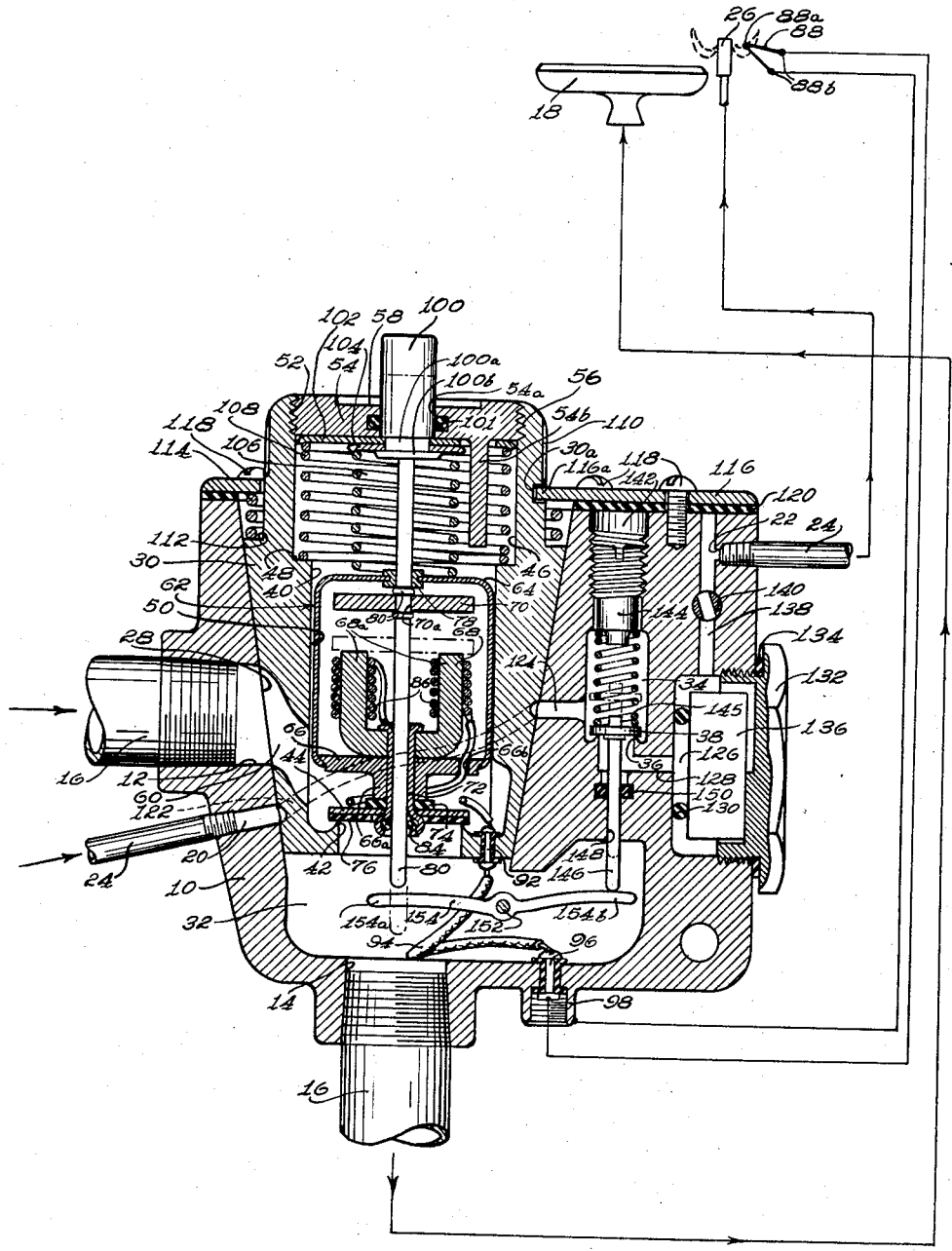
INVENTOR.
Russell B. Matthews
BY
Seegert & Schwalbach
Attys United States Patent Office 2,888,024
Patented May 26, 1959

2,888,024
FLOW CONTROL DEVICE

Russell B. Matthews, Wauwatosa, Wis., assignor to Baso Inc., Milwaukee, Wis., a corporation of Wisconsin Application February 6, 1956, Serial No. 563,683

16 Claims. (Cl. 137—66)

This invention relates to flow control devices, and more particularly to fluid flow control valves of the type having automatic shut-off means responsive to a certain condition.

The subject invention employs separate fluid passages for a main burner and a pilot burner; said burners forming a part of any desired fluid fuel burning apparatus such as a room or space heater, a water heater, a floor furnace, an oven burner, one or more stove top burners or the like. Independent passageways for the several burners are necessary in automatic shut-off devices, if it is desired to employ a condition responsive control valve upstream of the automatic shut-off valves since such condition responsive valve must control fuel flow to only the main burner if the automatic shut-off feature is not to take effect and shut down the entire fuel burning apparatus every time the condition responsive valve is moved to flow-preventing position.

A plug valve common to both of the passages affords manual control of fluid flow to each of the burners. In addition, separate automatic shut-off valves, under control of a single electromagnetic holding device positioned within an opening formed in the plug valve, are provided for each of such passages and the associated burners. The automatic shut-off valve which operates in the fluid passage for the main burner, comprises a valve disc which is movable within the aforementioned plug valve opening between flow-permitting and flow-preventing positions relative to a valve seat formed about one end of said plug valve opening.

Positioning of the holding device within the plug valve provides a structure wherein the reset stem can be brought out through the plug valve operating handle so that all of the manual operating means are thereby positioned in close proximity to each other, thus affording easy access thereto by an operator. Such arrangement also affords a very compact structure which is desirable in placing the valve device in a confined space, and permits the electromagnetic holding device and automatic shut-off valves to be removed for repair or replacement whenever the plug valve is in flow-preventing position without requiring additional valve means in the main and pilot fuel supply conduits upstream of the automatic shut-off valves as heretofore prevalent in the art.

It is therefore an object of the present invention to provide a very compact flow control device affording, in a single valve body, flow interruption, 100% shut-off on occurrence of an unsafe condition, and manually operable flow control means for preventing fluid flow upstream of the shut-off means to permit removal of the latter for purposes of repair and replacement.

Another object is to provide a compact control device as above described characterized by having a reset stem for the automatic shut-off means positioned concentric with the plug valve and extending from the operating handle thereof whereby all of the manually operable means are in close proximity for easy access by an operator.

Another object of this invention is to provide a fluid flow control device having separate main and pilot fuel passageways having automatic shut-off means and flow control means manually operable in both of said passageways to flow-preventing position to permit removal of the automatic shut-off valves and the holding means therefor for purposes of repair or replacement.

Another object of this invention is to provide a flow control device having a first flow control member movable between various flow controlling positions and formed with an opening or cavity within which is operatively positioned a second flow control member movable between flow-permitting and flow-preventing positions.

Another object is to provide a flow control device having a plug valve formed with an enlarged opening or cavity wherein is positioned electromagnetic holding means and an automatic shut-off valve; said plug valve having a flow control port in communication with but upstream of said cavity whereby positioning of said plug valve in flow-preventing position permits removal of said holding means and automatic shut-off valve for purposes of repair or replacement.

Another object of this invention is to provide a flow control device having a rotatable plug valve formed with an enlarged opening or cavity wherein is positioned an electromagnetic holding device having a movable electromagnet and a movable armature therefor, said armature being fixed to a reciprocatable reset stem for movement therewith to attracted relation with respect to said electromagnet, there being a reciprocatable valve member movable within said opening to flow-permitting position with respect to a valve seat formed within said opening, upon release of said reset stem whenever said electromagnet and armature are held in attracted relation.

Another object of the present invention is to provide a flow control device having separate main and pilot fuel supply passages and a single manually rotatable plug valve for control of fluid flow through both of said passages, there being automatic shut-off means for each of said passages comprising an electromagnetic holding mechanism recessed entirely within an enlarged opening or cavity formed in said plug valve and individual valve discs movable to flow-preventing positions in said passages respectively whenever said electromagnetic holding mechanism is deenergized; the valve disc for said main fuel passage being movable within said plug valve opening between flow-preventing and flow-permitting positions with respect to a valve seat formed about an open end of said plug valve opening.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawing which is a sectional view of a flow control device embodying the present invention and schematically showing the control device connected to main and pilot burners and to a thermoelectric generator.

Referring to the drawing, it shows a valve device comprising a valve body 10 formed with an internally threaded main outlet 12 and an internally threaded main outlet 14. Contiguous sections of a main fuel supply conduit 16 are threadedly connected to said inlet 12 and outlet 14; the former section connecting the valve device with a source of fluid fuel supply and the latter section, as schematically shown in the drawing, connecting such device with a main burner 18 of fluid fuel burning apparatus.

Valve body 10 is also formed with an internally threaded pilot inlet 20 and an internally threaded pilot outlet 22 to which contiguous sections of pilot fuel supply conduit 24 are connected; the section connected to inlet 20 affording further connection of said valve device with a source of fluid fuel and the section connected to outlet 22 affording connection of the device with a pilot burner 26, as schematically shown in the drawing.

Valve body 10 is further formed with a tapered cavity 28 which provides a seat for a rotatable plug valve 30. An intermediate chamber 32 is provided for housing certain operating levers to be hereinafter described, and a pilot valve chamber 34 having a valve seat 36 for a pilot valve 38 is provided as shown in the drawing.

Plug valve 30 is formed with a through opening 40, one end of which is formed with a valve seat 42 for cooperation with a valve member 44 to be hereinafter described in detail. The end of opening 40 opposite valve seat 42 is enlarged, as at 46, to provide an annular shoulder 48. The enlarged end portion 46 of opening 40 is formed with fastening means such as internal threads 52 for receiving and retaining a plug type cap 54 formed with means such as external threads 56, for engagement with the aforementioned internal threads 52 of plug valve 30. To facilitate insertion and removal of cap 54 in end portion 46, I prefer to form cap 54 with a depression or shallow cavity 58, said cavity being formed with an internal hexagonal or octagonal shape for receipt of a plug-type wrench with which a turning force can be applied to cap 54.

Plug valve 30 is also formed with a flow control port 60 affording communication between main inlet 12 and opening 40 of valve 30 to afford certain desirable operational functions, as will be hereinafter explained.

Positioned within an intermediate portion 50 of opening 40, is holding means commonly referred to in the art as a hood assembly 62. Such assembly 62 comprises an enclosure 64 having an end wall 66 formed with an extended portion 66a. Positioned within enclosure 64 is a U-shaped electromagnet core member 68 having leg portions 68a, 68a providing pole faces for magnetic cooperation with an armature 70.

As shown in the drawing, core member 68, and end wall 66 including extended portion 66a, and valve member 44 are each formed with an opening for receipt of fastening means such as hollow rivet 72, the latter of which is spun over at its ends, as shown, to firmly retain said members in fixed relative positions. In order to provide a cushioning effect between such parts, when assembled, to thereby retain them in their assembled relative position, I prefer to interpose a resilient washer 74 between valve member 44 and extended portion 66a of end wall 66. A valve facing 76 is firmly fixed, by any well known means, to valve member 44 as shown to afford a gas tight seal between valve member 44 and valve seat 42 whenever the former is in its flow-preventing position.

Enclosure 64 is formed with an opening provided with a resilient grommet 78, the opening of which is aligned with the through opening of hollow rivet 72 when assembled. A reset stem 80 is slidably positioned within the openings in said grommet 78 and rivet 72 and is fixed to armature 70 within an opening 70a formed therein. In order to prevent relative movement between armature 70 and reset stem 80, I employ snap rings 82, 82 inserted within appropriate annular grooves formed in stem 80 on opposite sides of armature 70, as shown in the drawing. To prevent passage of fluid fuel between reset stem 80 and rivet 72, an O-ring 84 is clampingly held by said rivet 72 against the outer surface of reset stem 80.

Legs 68a, 68a of core member 68 each have an energizing winding or coil 86 for providing magnetic flux flow in said core member 68 as is well understood in the art. I prefer to connect such windings 86, 86 in series relation to permit connection of the free end of one of such coils to ground and connection of the free end of the other such coil to a grounded source of thermoelectric power. In this regard, I employ a thermocouple 88 juxtaposed with respect to said pilot burner 26 so that the flame of the latter, when present, will afford heating of a hot junction 88a of said thermocouple 88. Thermocouple 88 also comprises cold junctions 88b, 88b. To afford energization of windings 86, 86 by thermocouple 88, I extend the free end of one of coils 86 through an opening 66b formed in end wall 66 and attach the same to one end of a terminal post or rivet 92, the latter being insulatedly fixed to plug valve 30. A lead wire 94 is attached to the other end of terminal post 92 and to one end of a terminal member 96 insulatedly positioned in valve body 10 as shown. The other end of terminal member 96 is connected in circuit with a cold junction 88b of thermocouple 88, the other cold junction 88b being connected to ground. I prefer to form valve body 10 with socket means such as extended portion 98 formed with internal threads for receipt of an adaptor (not shown) in circuit with cold junctions 88b, 88b of thermocouple 88.

One end of reset stem 80 is formed with an enlarged portion providing a manually operable reset button 100 extending through an opening 54a formed in cap 54. I prefer to employ an O-ring 101 between reset button 100 and cap 54 to prevent flow of fluid fuel therebetween. Said reset button 100 is formed with a reduced portion 100a for receiving retaining plates 102 and 104. In order to fixedly position said plates with respect to reset button 100, I prefer to spin over a portion of said reset button 100 against plate 104 as shown at 100b.

Positioned between plate 104 and enclosure 64 is a compression spring 106, and between plate 102 and annular shoulder 48 is a compression spring 108.

Cap 54 is formed with an extension 54b which serves as an abutment for enclosure 64 to limit movement of hood assembly 62 for a purpose to be hereinafter explained.

A portion of plug valve 30 extends exteriorly of valve body 10 and is formed with means such as knurling 110 to facilitate turning of said plug valve 30 by an operator. Valve 30 is also formed with an annular shoulder 112 which serves as an abutment for one end of a helical compression spring 114. A cover plate 116 is fixed to valve body 10 by means such as bolts 118 and engages the other end of compression spring 114 to cooperate therewith to retain plug valve 30 firmly seated within cavity 28. I prefer to interpose a sealing gasket 120 between valve body 10 and cover plate 116 to provide a gas-tight seal therebetween. Cover plate 116 is formed with a finger-like extension 116a which loosely fits within an annular groove 30a formed in plug valve 30. The ends of groove 30a are formed as abutments or shoulders which cooperate with extension 116a to limit rotational movement of said plug valve 30 as is well understood in the art.

Plug valve 30 is further formed with a peripheral groove 122, one end of which may be positioned in registration with pilot inlet opening 20 by appropriately positioning plug valve 30. Such movement effects registration of the other end of groove 122 with a fuel passageway 124 formed in valve body 10 in communication with pilot valve chamber 34. Leading from chamber 34 to a filter chamber 126, is a fuel passageway 128. A large resilient ring 130 and a retaining nut 132 threadably secured in valve body 10 against a gas sealing washer 134, cooperate to retain a filter 136 in operating position within filter chamber 126. A passageway 138 affords communication between filter chamber 126 and pilot fuel outlet 22 and has positioned therein a pilot control valve 140 to permit of adjustment of the pilot burner flame as is well understood in the art. As shown in the drawing, I prefer to form passageway 138 and pilot valve chamber 34 by working from the upper surface of valve body 10, as evidenced by the drilled holes which connect such passageway and chamber with said upper surface of body 10. The ends of such holes are sealed by cover plate 116 and gasket 120 as shown in the drawing. In this regard, I prefer to further form body 10 with a threaded opening 142 for receipt of an adjusting plug 144. This plug not only aids in sealing off pilot valve chamber 34 but also provides means whereby the force of a compression spring 146 on pilot valve 38 can be readily adjusted.

A pilot valve stem 146 rigidly fixed to pilot valve 38 extends through an opening 148 formed in valve body 10 between intermediate chamber 32 and pilot fuel passageway 128. I prefer to employ an O-ring 150 between stem 146 and valve body 10 to prevent flow of fluid fuel therebetween.

Pivotally positioned within intermediate chamber 32 by means of pin 152, is an actuating lever 154 having substantially oppositely disposed arms 154a and 154b for coaction respectively with reset stem 80 and pilot valve stem 146 as will hereinafter appear.

The operation of the subject valve device is as follows:

In order to effect ignition of main burner 18, it is first necessary to manually rotate plug valve 30 for registration of groove 122 with pilot inlet opening 20 and passageway 124. This permits fluid fuel to flow through pilot inlet opening 20, groove 122 and passageway 124 to pilot valve chamber 34. The fuel is prevented from flowing to pilot burner 26 by pilot valve 38 which is firmly retained in its flow-preventing position by compression spring 145. Such movement of plug valve 30 also effects registration of flow control port 60 with main inlet opening 12, but fuel is prevented from flowing to main burner 18 by main valve 44 which is held in its flow-preventing position, in engagement with valve seat 42, by the force of compression spring 106 on the end wall of enclosure 64.

In order to permit fuel to flow to pilot burner 26 for ignition thereof, reset button 100 is manually depressed against the forces of compression springs 106 and 108 thus moving reset stem 80 until armature 70 engages the pole faces of legs 68a, 68a of electromagnet core member 68. Such movement of reset stem 80 causes actuating lever 154 to be rotated in a counterclockwise direction by virtue of engagement of the lower end of reset stem 80 with arm 154a. Arm 154b is thereby caused to engage pilot valve stem 146 and move the same against the force of compression spring 145 to its flow-permitting position; whereupon fluid fuel is permitted to flow from pilot valve chamber 34 through passageway 128, filter 136, passageway 138 and pilot fuel outlet 22 to pilot burner 26. The fuel thus emitted at pilot burner 26 may be ignited in any well known manner.

Interruption of fuel flow to main burner 18 throughout the aforedescribed resetting movement of reset stem 80 is assured by virtue of the force exerted by armature 70 against electromagnet core member 68, which force is transmitted to valve member 44 to retain the same in its flow-preventing position.

Reset button 100 must be held in its depressed position for a length of time sufficient to permit the flame at pilot burner 26 to heat the hot junction 88a of thermocouple 88 for energization of electromagnet windings 86, 86. Such energization provides a magnetic flux flow in core member 68 and armature 70 when in attracted relation. As soon as sufficient magnetic flux is generated to provide a force strong enough to overcome compression spring 106, reset button 100 may be released, whereupon hood assembly 62 and valve member 44 are moved under the influence of compression spring 108 until enclosure 64 abuts against extension 54b. Such movement of valve member 44 permits fluid fuel to flow from main inlet 12 through flow control port 60, a portion of opening 40 in plug valve 30, intermediate chamber 32 and main fuel outlet 14 to main fuel burner 18.

Further, release of reset button 100 effects movement of reset stem 80 to an intermediate position as determined by engagement between enclosure 64 and extension 54b; whereupon actuating lever 154 is permitted to rotate in a clockwise direction about pin 152 under the influence of compression spring 145. Such return rotation of lever 154 is limited by reset stem 80 which positions said lever 154 in an intermediate position wherein pilot valve 38 is retained in its flow-permitting position. The fluid fuel thus emitted at main burner 18 is readily ignited by the flame of pilot burner 26 thereby placing the fluid fuel burning apparatus which comprises burners 18 and 26 in operating condition.

From the foregoing it will be noted that the distance between armature 70 and the pole faces of core member 68, when in unattracted relation, is directly related to the distance between the top of enclosure 64 and the bottom end of extension 54b. That is, the distance between armature 70 and core member 68 determines the amount of movement of valve member 38 to its flow-permitting position during resetting operation, and the distance between enclosure 64 and extension 54b determines the amount of return movement of said valve 38 toward flow-preventing position upon release of reset button 100. It is thus seen that in order to maintain pilot valve 38 in open position while main burner 18 is ignited, the distance between armature member 70 and core member 68 must be greater than the distance between enclosure 64 and extension 54b.

Upon occurrence of an unsafe condition, namely, outage of the flame at pilot burner 26, the hot junction 88a of thermocouple 88 will be cooled by the surrounding atmosphere thus causing the magnetic attraction between core member 68 and armature member 70 to decrease to a point where the force of compression spring 106 separates core member 68 and armature member 70 and returns valve member 44 to its flow-preventing position. Such separation of members 68 and 70 permits spring 106 to return reset stem 80 to its initial position thus permitting compression spring 145 to rotate lever 154 in a clockwise direction and return pilot valve 38 to its flow-preventing position. Thus the subject device provides automatic shut-off upon occurrence of an unsafe condition.

Should it be desired to extinguish the flames of burners 18 and 26 while safe conditions prevail, it is merely necessary to rotate plug valve 30 to interrupt the aforementioned registration between pilot inlet 20 and groove 122, and between main inlet 12 and flow control port 60. Such movement of plug valve 30 immediately interrupts fuel flow to both of said burners thereby initiating cooling of hot junction 88a of thermocouple 88 for subsequent closure of valve members 44 and 38 as above described.

It will be noted that plug valve 30 cannot be rotated beyond the limits afforded by engagement of extension 116a and the hereinbefore described abutments of groove 30a of plug valve 30. This feature is desirable in that it prevents undue twisting and bending of lead wire 94 which is connected to both valve body 10 and plug valve 30.

Various characteristics of the flame at pilot burner 26 can be adjusted merely by suitable rotation of pilot flame control valve 140 as well known in the art. Also, the force of compression spring 145 can be readily changed merely by repositioning adjusting plug 144 within valve body 10. It is noted that compression spring 108 may be omitted from the structure shown in the drawing, provided compression spring 145 is strong enough to move the entire hood assembly 62 and main valve member 44 together with valve member 38 upon release of reset button 100.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a fluid flow control device, in combination, a valve body formed with a fluid passage, a first movable flow control member in said valve body formed with a control port having an upstream end for flow-permitting and flow-preventing cooperation with said fluid passage and a downstream end formed with a valve seat, said first flow control member being formed with a cavity communicating with said control port, a second flow control member movable within said control port between flow-permitting and flow-preventing positions relative to said valve seat, operating means for said second flow control member positioned within said cavity and comprising a first movable member operatively associated with said second flow control member, a second movable member biased to separated relation with respect to said first movable member and movable against said bias from an initial position to a second position in attracted relation with respect to said first movable member, and means for coupling said first and second movable members when in said attracted relation, and means biasing said coupled members toward the initial position of said first movable member for movement of said second control member from its flow-preventing to its flow-permitting position.

2. In a fluid flow control device, in combination, a valve body formed with first and second independent fluid passages, a first movable flow control member in said valve body formed with a control port having an upstream end for flow-permitting and flow-preventing cooperation with said first fluid passage and a downstream end formed with a valve seat, said first flow control member also being provided with flow control means for flow-permitting and flow-preventing cooperation with said second fluid passage, a second flow control member movable within said control port between flow-permitting and flow-preventing positions relative to said valve seat, operating means for said second flow control member comprising a pair of relatively movable coupling members operatively associated with said second flow control member and movable to coupled and uncoupled relations, and biasing means biasing said coupling members toward uncoupled relation and said second flow control member toward flow-preventing position, means for coupling said coupling members in coupled relation, said coupling members being normally held in coupled relation when moved thereto against the bias of said biasing means.

3. In a fluid flow control device, in combination, a valve body formed with a fluid passage, a rotatable plug valve in said valve body formed with a control port having an upstream end for flow-permitting and flow-preventing cooperation with said fluid passage and a downstream end formed with a valve seat, a flow control member movable entirely within said control port between flow-permitting and flow-preventing positions relative to said valve seat, operating means for said flow control member comprising a first movable member operatively associated with said flow control member, a second movable member biased to separated relation with respect to said first movable member and movable against said bias from an initial position to a second position in attracted relation with respect to said first movable member, means for coupling said first and second movable member when in said attracted relation, means biasing said coupled members toward the initial position of said second movable member for movement of said control member from its flow-preventing to its flow-permitting position, and actuating means for effecting movement of said second movable member to its second position and for effecting rotation of said plug valve as desired for control of fluid flow through said passage.

4. In a fluid flow control device, in combination, a valve body formed with a fluid passage, a rotatable plug valve in said valve body formed with a through opening for flow-permitting and flow-preventing cooperation with said fluid passage upon rotation of said plug valve, said plug valve having a valve seat formed about said through opening, a reciprocatable flow control member movable entirely within said opening toward and away from said valve seat for control of the fluid flow through said opening, electromagnetic operating means for said second flow control member comprising first and second movable magnetic members operatively associated with said flow control member and movable to attracted and separated relations, first means biasing said magnetic members toward separated relation and said control member toward said seat, said second magnetic member being movable against the bias of said first biasing means from an initial position to a second position in attracted relation with respect to said first magnetic member, energizable coil means for magnetically coupling said first and second magnetic members when in said attracted relation, and second means biasing said coupled members toward the initial position of said first magnetic member for movement of said flow control member away from said seat.

5. In a fluid flow control device, in combination, a valve body formed with first and second fluid passages, a first movable flow control member in said valve body formed with a control port having an upstream end for flow-permitting and flow-preventing cooperation with said first fluid passage and a downstream end formed with a valve seat, said first flow control member also being provided with flow control means for flow-permitting and flow-preventing cooperation with said second fluid passage, a second flow control member movable within said control port between flow-permitting and flow-preventing positions relative to said valve seat, a third flow control member movable within said second fluid passage between flow-permitting and flow-preventing positions, operating means for said second and third flow control members comprising a pair of relatively movable coupling members operatively associated with said second and third flow control members and movable to coupled and uncoupled relations, and biasing means biasing said coupling members toward uncoupled relation and said second and third flow control members toward flow-preventing positions.

6. In a fluid flow control device, in combination, a valve body formed with first and second fluid passages, a first movable flow control member in said valve body formed with a control port having an upstream end for flow-permitting and flow-preventing cooperation with said first fluid passage and a downstream end formed with a valve seat, said first flow control member also being provided with flow control means for flow-permitting and flow-preventing cooperation with said second fluid passage and a cavity communicating with said control port, a second flow control member movable within said control port between flow permitting and flow-preventing positions relative to said valve seat, a third flow control member movable within said second fluid passage between flow-permitting and flow-preventing positions, operating means for said second and third flow control members positioned within said cavity and comprising a pair of relatively movable coupling members operatively associated with said second and third flow control members and movable to coupled and uncoupled relations, and biasing means biasing said coupling members toward uncoupled relation and said second and third flow control members toward flow-preventing positions.

7. A fluid flow control device, in combination, a valve body formed with first and second fluid passages, a first flow control member having flow-permitting and flow-preventing positions in said first fluid passage, a second flow control member having flow-permitting and flow-preventing positions in said second fluid passage, operating means for said first and second flow control members comprising a first movable member operatively associated with said first flow control member and a second movable member operatively associated with said second flow control member, said movable members having coupled and uncoupled relative positions, means biasing said movable members to uncoupled relation and said first and second flow control members to flow-preventing positions, means for moving said first movable member from an initial position to a second position in coupled relation to said second movable member, such movement of said first movable member moving said first flow control member to its flow-permitting position and maintaining said second flow control member in its flow-preventing position, and means independent of said biasing means for moving said first movable member to an intermediate position when coupled to said second movable member to move said second flow control member to its flow-permitting position and retain said first flow control member in its flow-permitting position.

8. A fluid flow control device, in combination, a valve body formed with first and second fluid passages, a control valve in said valve body formed with a control port having an upstream end for flow-permitting and flow-preventing cooperation with said first fluid passage and a downstream end formed with a valve seat, said control valve being formed with a cavity communicating with said control port and flow control means for control of fluid flow through said second fluid passage, a first flow control member movable within said control port between flow-permitting and flow-preventing positions relative to said valve seat, a second flow control member having flow-permitting and flow-preventing positions in said second fluid passage, operating means for said first and second flow control members positioned within said cavity and comprising a first movable member operatively associated with said first flow control member and a second movable member operatively associated with said second flow control member, said movable members having coupled and uncoupled relative positions, means biasing said movable members to uncoupled relation and said first and second flow control members to their flow-preventing positions, means for moving said second movable member from an initial position to a second position in coupled relation to said first movable member to move said second flow control member to its flow-permitting position and maintain said first flow control member in its flow-preventing position, and means for moving said second movable member to an intermediate position when coupled to said first movable member to move said first flow control member to its flow-permitting position and retain said second flow control member in its flow-permitting position.

9. A fluid flow control device, in combination, a valve body formed with first and second fluid passages, a control valve in said valve body formed with a control port having an upstream end for flow-permitting and flow-preventing cooperation with said first fluid passage and a downstream end formed with a valve seat, said control valve being formed with a cavity communicating with said control port and flow control means for control of fluid flow through said second fluid passage, a first flow control member movable within said control port between flow-permitting and flow-preventing positions relative to said valve seat, a second flow control member having flow-permitting and flow-preventing positions in said second fluid passage, operating means for said first and second flow control members positioned within said cavity and comprising a first movable member operatively associated with said first flow control member and a second movable member operatively associated with said second flow control member, said movable members having coupled and uncoupled relative positions, means biasing said movable member to uncoupled relation and said first and second flow control members to their flow-preventing positions, said second movable member being movable from an initial position to a second position in coupled relation to said first movable member to move said second flow control member to its flow-permitting position and maintain said first flow control member in its flow-preventing position, means for moving said second movable member to an intermediate position when coupled to said first movable member to move said first flow control member to its flow-permitting position and retain said second flow control member in its flow-permitting position, and actuating means for effecting resetting movement of said second movable member to its said second position and for effecting movement of said control valve for controlling fluid flow through said first and second passages as desired.

10. In a fluid flow control device, in combination, a valve body formed with a fluid passage, a first rotatable flow control member in said valve body formed with a control port having an upstream end for flow-permitting and flow-preventing cooperation with said fluid passage and a downstream end formed with a valve seat, said first flow control member being formed with an interior cavity communicating with said control port, a second flow control member movable within said control port between flow-permitting and flow-preventing positions relative to said valve seat, condition responsive electromagnetic operating means for said second flow control member positioned within said interior cavity and comprising a first movable magnetic member operatively associated with said second flow control member, a second movable magnetic member biased to separated relation with respect to said first movable member and movable against said bias from an initial position to a second position in attracted relation with respect to said first movable member, and means for energizing one of said magnetic members for coupling said first and second movable magnetic members when in said attracted relation, and means biasing said coupled magnetic members toward the initial position of said second movable member for movement of said second control member from its flow-preventing to its flow-permitting position.

11. In a fluid flow control device, in combination, a valve body formed with a fluid passage, a first flow control member in said valve body formed with a control port and rotatable between flow-permitting and flow-preventing relationship therewith, a second flow control member disposed entirely within said control port and having flow-permitting and flow-preventing positions therewith, and operator means carried by said first control member for said second control member comprising a first movable member operatively associated with said second flow control member, a second movable member biased toward separated relation with respect to said first movable member and movable against said bias from an initial position to a second position in attracted relation with respect to said first movable member, and means for coupling said first and second movable members when in said attracted relation, and means biasing said coupled members toward the initial position of said second movable member for movement of said second control member from its flow-preventing to its flow-permitting position.

12. A fluid flow control device comprising in combination, a control body formed with a fluid passage, a first flow control member in said body formed with a control port and movable between flow-permitting and flow-preventing positions with respect to said fluid passage, a second flow control member disposed within said control port and having flow-permitting and flow-preventing positions, and operator means for said second control member comprising first and second movable members, said first movable member being operatively associated with said second flow control member, biasing means including means biasing said movable members toward initial positions in separated relation, said members being relatively movable against said bias to attracted relation, and means for coupling said first and second movable members when in said attracted relation, said biasing means also including means biasing said coupled members toward the initial position of said second movable member and thereby biasing said second control member toward its flow-permitting position.

13. A fluid flow control device comprising in combination, a control body formed with a fluid passage, a first flow control member in said body formed with a control port and movable between flow-permitting and flow-preventing positions with respect to said fluid passage, a second flow control member disposed within said control port and having flow-permitting and flow-preventing positions, and operator means for said second control member comprising first and second movable members, said first movable member being operatively associated with said second flow control member, biasing means including a first spring biasing said movable members toward initial positions in separated relation, said members being relatively movable against the bias of said first spring to attracted relation, and means for coupling said first and second movable members when in said attracted relation, said biasing means also including a second spring biasing said coupled members toward the initial position of said second movable member and thereby biasing said second control member toward its flow-permitting position.

14. A fluid flow control device comprising in combination, a control body formed with a fluid passage, a first flow control member in said body formed with a control port and movable between flow-permitting and flow-preventing positions with respect to said fluid passage, a second flow control member disposed within said control port and having flow-permitting and flow-preventing positions, and operator means for said second control member comprising first and second movable members, said first movable member being operatively associated with said second flow control member for disposition of the latter in flow-preventing position when said first movable member is in its initial position, first spring means biasing said movable members toward initial positions in separated relation, second spring means biasing said first movable member toward its initial position, means for resetting said movable members to attracted relation, and means for coupling said movable members when in said attracted relation, said second spring means biasing said coupled members toward the initial position of said second movable member and thereby said second control member toward its flow-permitting position.

15. A fluid flow control device comprising in combination, a control body formed with a fluid passage, a first flow control member for said passage, a second flow control member disposed within said control port, a third flow control member, said first, second and third flow control members each having flow-permitting and flow-preventing positions, and operator means for said second and third control members comprising first and second coupling members having separated initial positions and relatively movable to coupled relation operatively connected to said second and third flow control members respectively for disposition of the latter in their flow-preventing positions when said coupling members are in their said initial positions, biasing means to bias both of said coupling members toward their initial positions, and positioning means operatively coacting with said coupling members, when coupled, to position the latter so that neither one of said coupling members is in its initial position and through said operative connection said second and third flow control members are disposed in flow-permitting positions, said biasing means on uncoupling of said coupling members, effecting movement of each of said coupling members toward its initial position for movement of said second and third flow control members toward flow-preventing position.

16. A fluid flow control device comprising in combination, a control body formed with a fluid passage, a first flow control member for said passage, a second flow control member disposed within said control port, a third flow control member, said first, second and third flow control members each having flow-permitting and flow-preventing positions, and operator means for said second and third control members comprising first and second coupling members having separated initial positions and relatively movable to coupled relation operatively connected to said second and third flow control members respectively for disposition of the latter in their flow-preventing positions when said coupling members are in their said initial positions, first biasing means to bias both of said coupling members toward their initial positions, and positioning means including second biasing means operatively coacting with said coupling members, when coupled, to position the latter so that neither one of said coupling members is in its initial position and through said operative connection said second and third flow control members and disposed in flow-permitting positions, said first biasing means on uncoupling of said coupling members, effecting movement of each of said coupling members toward its initial position for movement of said second and third flow control members toward flow-preventing position.

References Cited in the file of this patent

UNITED STATES PATENTS

| | | |
|---|---|---|
| 2,542,127 | Ewing | Feb. 20, 1951 |
| 2,589,573 | Ray | Mar. 18, 1952 |
| 2,718,918 | Marvin | Sept. 27, 1955 |
| 2,800,135 | Grayson et al. | July 23, 1957 |